R. C. PENFIELD.
MACHINE FOR HANDLING BRICKS.
APPLICATION FILED JAN. 5, 1909.
962,584.
Patented June 28, 1910.
4 SHEETS—SHEET 3.
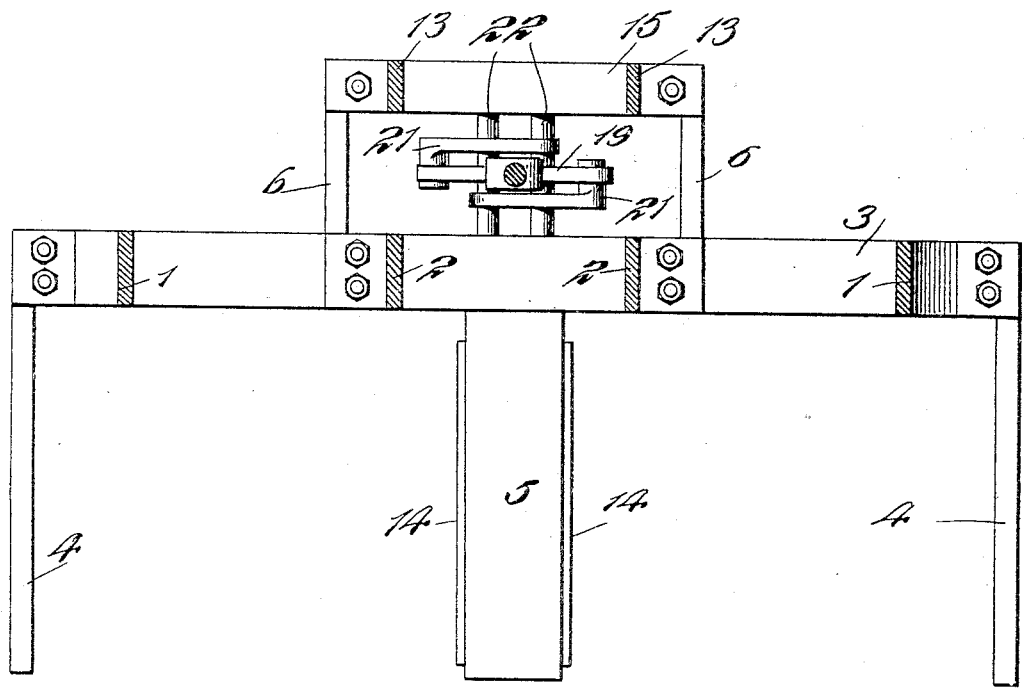
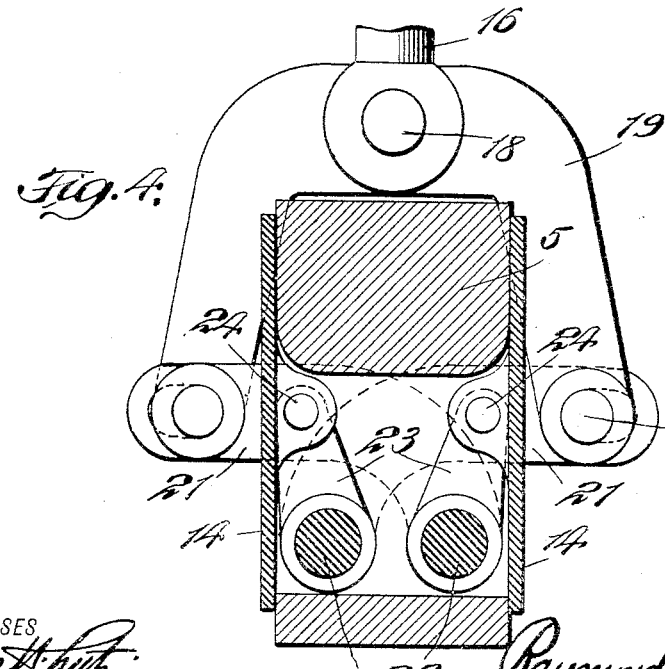
WITNESSES
Julius H. Smith
C. B. Schroeder
INVENTOR
Raymond C. Penfield
BY
Fred C. Tasker
ATTORNEY
ANDREW B. GRAHAM CO., PHOTO-LITHOGRAPHERS, WASHINGTON, D. C.

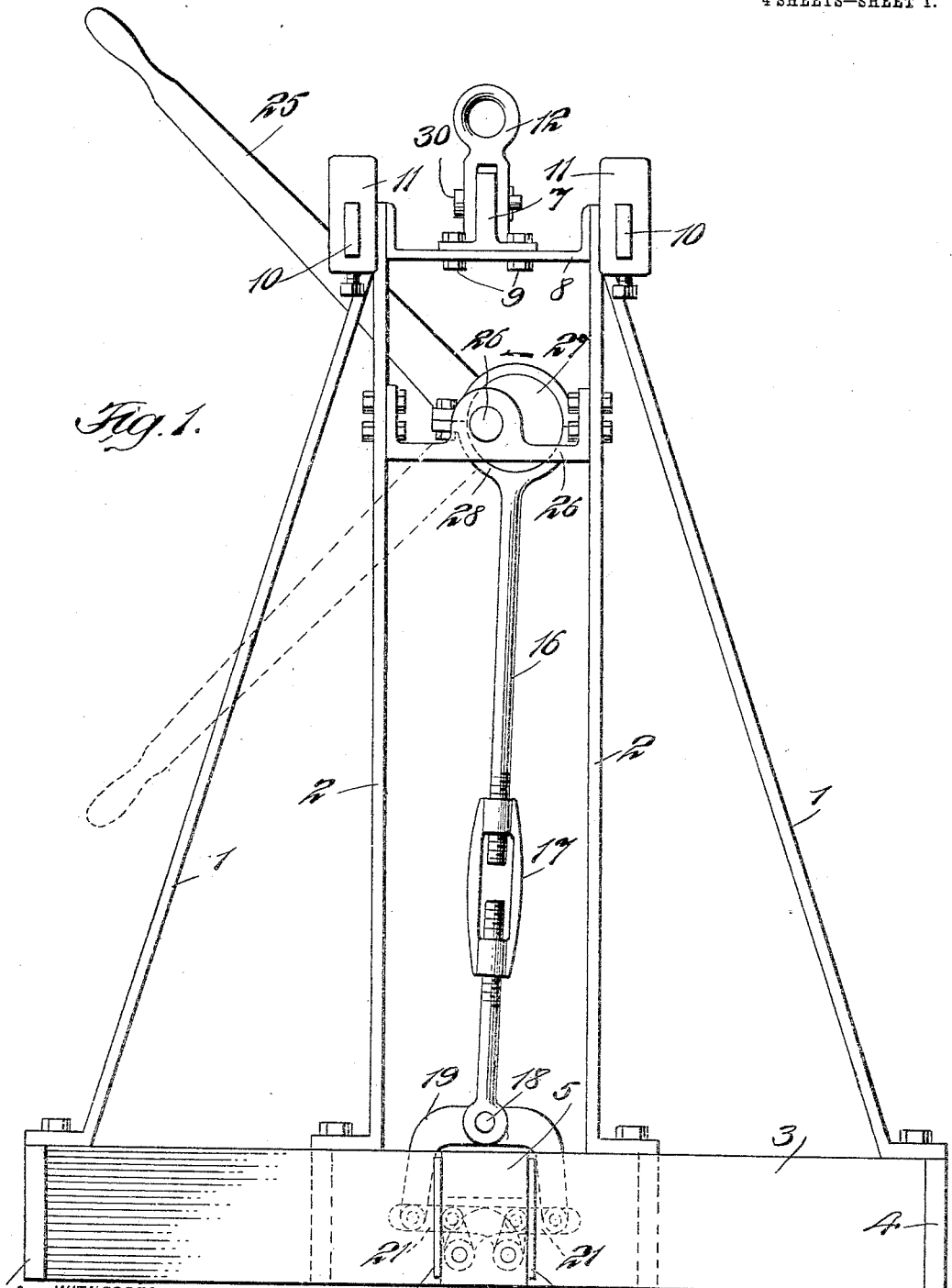

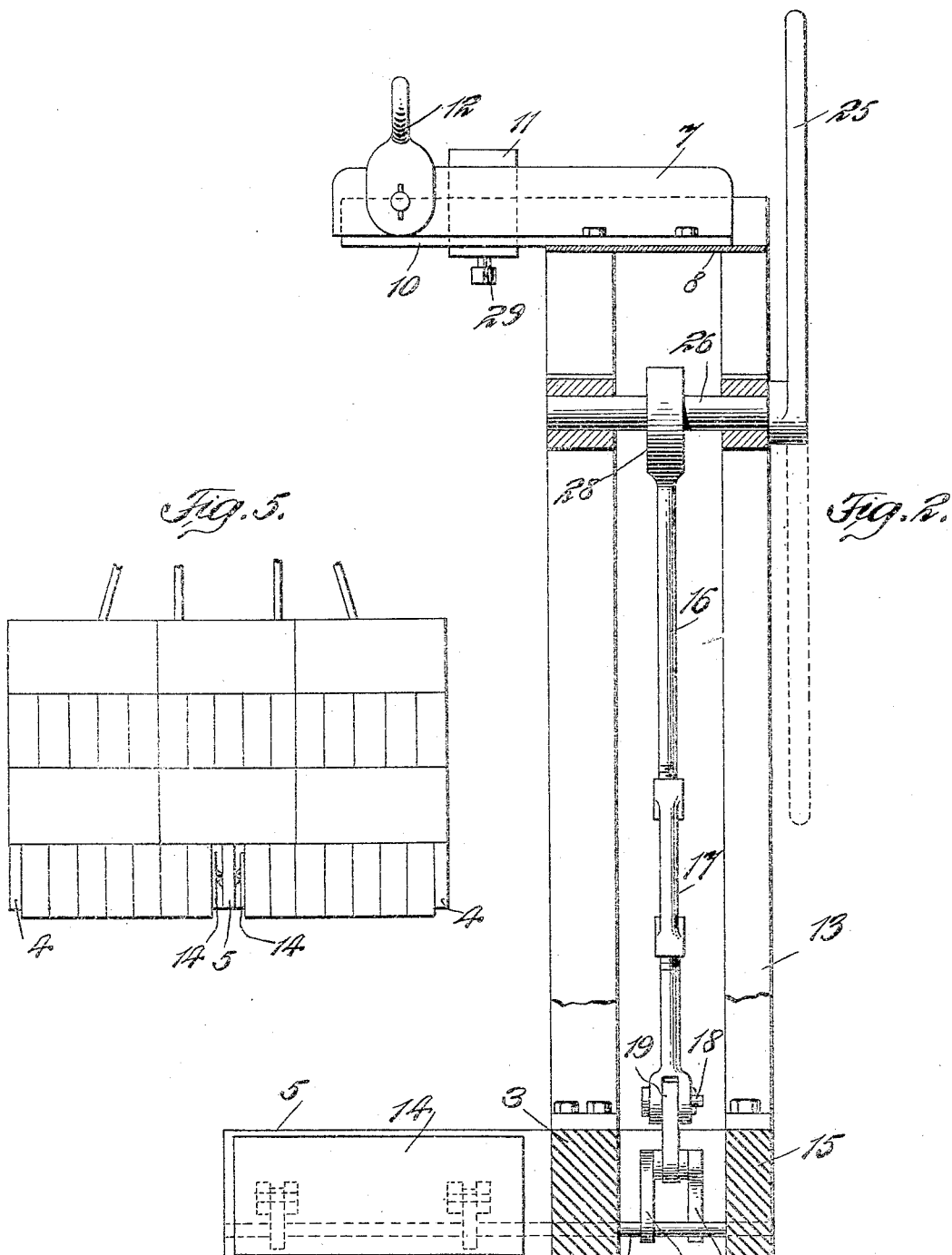

R. C. PENFIELD.
MACHINE FOR HANDLING BRICKS.
APPLICATION FILED JAN. 5, 1909.
962,584.
Patented June 28, 1910.
4 SHEETS—SHEET 4.
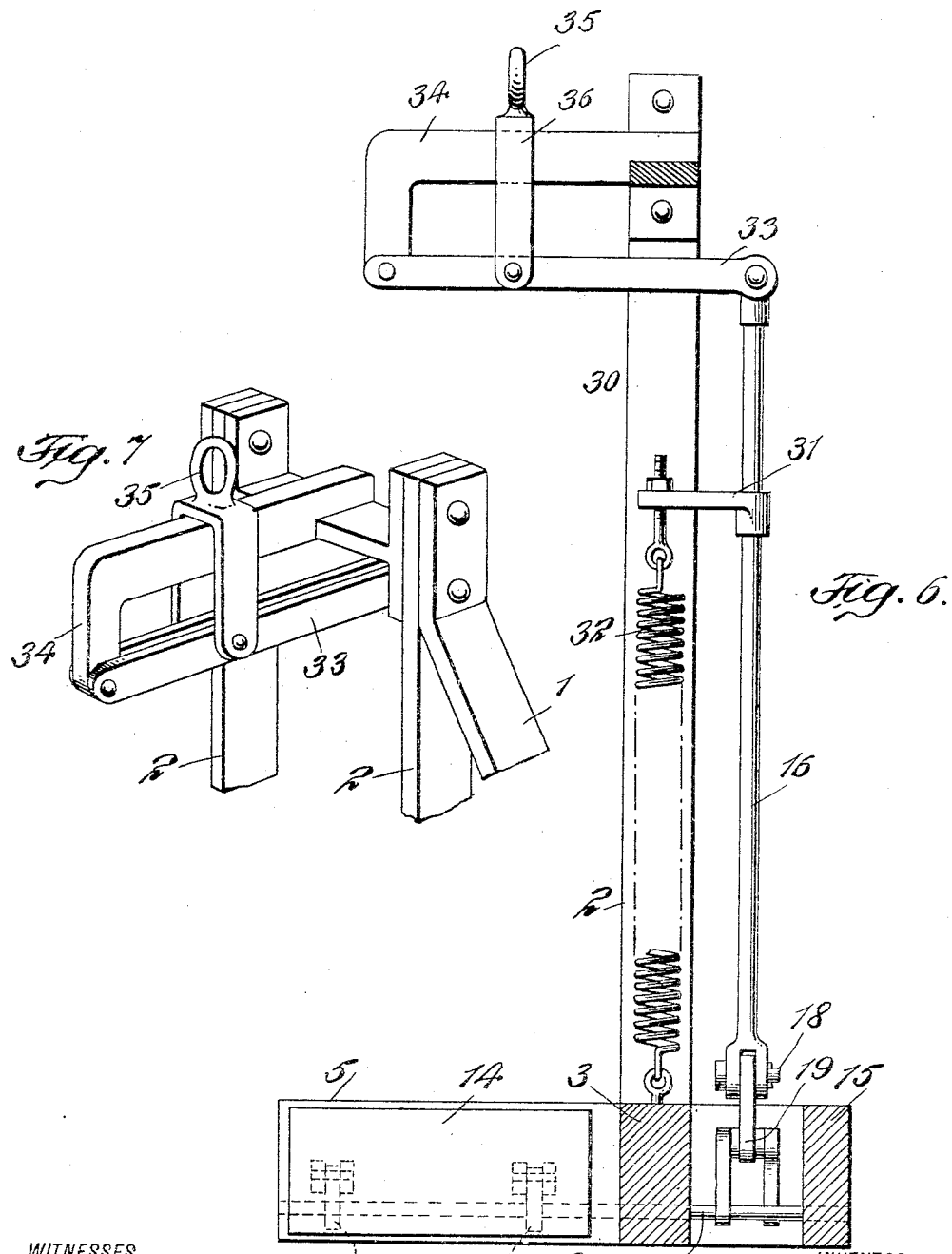

UNITED STATES PATENT OFFICE.

RAYMOND C. PENFIELD, OF NEW YORK, N. Y.

MACHINE FOR HANDLING BRICKS.

962,584. Specification of Letters Patent. Patented June 28, 1910.

Application filed January 5, 1909. Serial No. 470,804.

*To all whom it may concern:*

Be it known that I, RAYMOND C. PENFIELD, a citizen of the United States of America, residing at New York city, in the county of New York and State of New York, have invented certain new and useful Improvements in Machines for Handling Bricks, of which the following is a specification, reference being had therein to the accompanying drawing.

This invention relates to a machine for handling bricks, said machine being of the general class wherein means are employed for grasping the lower layer which is usually shorter than the superposed mass and gripping the same tightly for the purpose of lifting the entire mass of brick in bulk. The bricks with which such a machine is used are hacked up in a regular order and in a rectangular form with the basic layer consisting of numerous units which are set close to each other so as to form a consolidated layer. In my co-pending application for Letters Patent, filed October 8, 1908, Serial No. 456,692, for a machine for handling brick, I have described mechanism for accomplishing this purpose.

The object of my present improvements is to provide another form of mechanism, and to simplify and perfect the same so that economy in construction as well as facility in operation may be conserved.

The present invention, moreover, relates to that particular class of machines designed to operate with a basic layer which is not only shorter at the ends than the superposed mass, but is split or divided at a central point intermediate between its ends so that the clamping effect may be exerted centrally as well as terminally upon the layer, and such being the case one of my leading aims is to simplify the clamping devices so that they may have as few parts as possible and may be operated easily and effectively by as simple a mechanism as possible.

With these and other objects in view, my invention therefore consists essentially in the construction and combination of parts substantially as hereinafter described and then more particularly pointed out in the claims.

In the accompanying drawings illustrating my invention, Figure 1 is a front elevation of my improved machine for handling bricks. Fig. 2 is a sectional side elevation of the same. Fig. 3 is a horizontal sectional plan view. Fig. 4 is an enlarged detail cross section of the lifting finger and the clamp-operating mechanism arranged in proximity thereto. Fig. 5 is a side elevation of a unit stack of bricks with my present improved lifting machine shown as operatively applied thereto. Fig. 6 is a sectional side elevation of a modified form of the invention in which the clamp is automatically applied by the initial lifting movement. Fig. 7 is a detail perspective view of the upper portion of that form of frame delineated in Fig. 6.

Similar characters of reference designate corresponding parts throughout the different figures of the drawings.

The frame of the machine may vary within wide limits, and I do not wish to be restricted to any special construction. In the specimen illustrated in the drawings, in Figs. 1 and 2, 1, 1 denote inclined side bars between which are the parallel vertical uprights 2, 2. The inclined bars 1 and the vertical uprights 2 are bolted at their lower ends to the horizontal base bar 3, and at their upper ends are secured together by the horizontal strut 8. The strut 8 is, moreover, secured firmly to the vertical pieces 13 which are directly behind the uprights 2, said pieces 13 being bolted at their lower ends to a bar 15 that is connected to the elongated main base bar 3 by means of horizontal connections 6, 6.

The main base bar 3 is secured rigidly to or made integral with a pair of vertical projecting end plates 4, 4, and also with a central bar 5 which is intermediate between said end plates 4. The bar 5 is a lifting finger, and is designed to be inserted in the center of the basic layer and exercises a lifting function on the superposed mass. The end plates 4, 4 may also serve as lifting fingers if desired. It will be obvious that the end plates 4, in conjunction with the base bar 3, constitute a rectangular frame or yoke designed to embrace the stack formation of bricks on three sides thereof when the machine is brought close up against the stack for the purpose of engaging and lifting the same, and when in such a placing of the machine the end pieces 4 are brought into proximity to the ends of the basic layer, the central bar or lifting finger 5 will be introduced into the space at the center of the basic layer and there adapted to perform its lifting function. The end plates 4 do not carry any clamping devices, but serve simply as solid abutments or walls which may come firmly against the ends of the tier of bricks, while the clamping effect is produced at the center of said basic layer by means of a pair of clamping plates 14 carried by the central finger 5 and operatively arranged on both sides of the latter, so that they may expand against the adjacent faces of the bricks and enable the two sections of the split basic layer to be effectively clamped against the rigid end pieces 4.

The clamping plates 14 are actuated in the following manner: A vertical rod 16 extends alongside of and within the parts 2 and 13 of the main frame, as indicated in Figs. 1 and 2. Said rod 16 is preferably made in two parts connected by a turnbuckle 17 so that it may be lengthened or shortened for the purpose of properly proportioning it to the work it is to perform. The lower end of rod 16 is pivotally connected at 18 to a yoke 19. The ends of the yoke 19 are pivotally connected by pivot pins 20 to curved arms 21 which are rigidly fastened to the two horizontal shafts 22 which are rotatably supported in the main frame 3 and 15 as clearly indicated in Figs. 2 and 3. These shafts 22 are provided with rigidly attached crank arms 23 which are pivoted to the rear faces of the clamping plates 14 at the pivotal points 24 as indicated in Fig. 4. Obviously therefore the lifting of the yoke 19 will lift the curved arms 21 and thereby rotate to a greater or less extent the parallel horizontal shafts 22. Their rotation manifestly actuates the crank arms 23 thereon and communicates motion to the clamping plates 14 which are in consequence moved laterally toward or away from each other, being all the while kept in a vertical position. When they are moved away from each other and caused to clamp against the sections of the basal layer of bricks as shown in Fig. 5, the effect obviously will be to bind the two parts of said basal layer against the terminal rigid parts 4 of the main frame, and thereby cause the machine to grasp the lower layer of bricks so that not only it but the superposed mass may easily be lifted.

The vertical rod 16 may be actuated in a variety of ways, but a simple and convenient device for accomplishing this consists of a hand lever 25 which is firmly attached to a horizontal shaft 26 supported in suitable bearings in the main frame as indicated in Figs. 1 and 2. One of these bearings is in the vertical part 13 of the frame, and the other in a cross piece 26 which is bolted between the parallel uprights 2, 2. On shaft 26 is an eccentric 27 working in an eccentric ring 28 formed as a part of the upper end of the operating rod 16. The movement of the lever handle 25 rotates the shaft 26 and thereby revolves the eccentric 27 which in turn communicates motion to the eccentric ring 28 and causes the rod 16 to move up and down, the result of which is to actuate the clamping members 14 in the manner I have already explained. The lever handle 25 in its movements passes from the position shown in full lines in Fig. 1 to that shown in dotted lines in the same figure, and vice versa. When the machine is in actual operation and has been brought into close proximity into a stack formation of brick for the purpose of grasping the same, the operator before bringing the lifting crane into action will first manipulate the handle 25 and cause the clamping members 14 to tightly grasp the lower layer of bricks. When the machine has thus been clamped to the stack formation, the whole can be lifted by the lifting crane suitably applied thereto.

At the upper end of the main frame are parallel horizontal arms 10 which carry weights 11 that are adjustable thereon and are held in any desired position of adjustment by means of set screws 29. Secured to the strut 8, which is at the top of the parallel center bars 2, is a horizontal arm 7 which is located midway between the parallel arms 10. Pivoted to the arm 7 at 30 is an eye 12 to which a lifting crane or other suspension means may be connected. Obviously the adjustment of the weights 11 along the length of the parallel arms 10 will enable the center of gravity of the entire mass to be controlled so that the machine may be kept in a vertical position whether loaded or unloaded. The connection of the suspension means to the eye 12 being made at a fixed point at which the lifting strain to the machine is applied, it is obvious that the latter will not be always kept in a vertical position whether loaded or unloaded unless there is some adjustment of the weight, for the machine will change its center of gravity of course according to the load, and will at times have a tendency to throw forward out of the vertical position where it will be inconvenient to properly bring it into position for easy handling. By shifting the weights 11, however, relatively to the eye 12 it will be obvious that the equilibrium of the machine can be controlled and the machine kept in a proper upright position whether it have more or less weight thereon through the grasping of the stack formation of bricks, or whether it be empty.

In the foregoing description I have discussed the construction and operation of the machine in a case where the clamping effect is produced through the operation of a lever mechanism, it thus being necessary to apply manual force which is independent of the lifting strain employed for raising and transporting the machine and the load. It is useful, however, in many cases to have the machine so built that the initial lifting movement will automatically be communicated to the clamping members with the result of causing them to be applied to the bricks. In Figs. 6 and 7, I have therefore represented a modification of the invention, whereby this automatic clamping effect takes place when the lifting strain of the lifting crane or other suspension means is applied. The main frame 30 includes the parallel vertical pieces 2 secured to the base 3, and alongside of said base 3 is the bar 15 the same as in Figs. 2 and 3. Also, the lifting rod 16 applies power through the yoke 19, the curved arms 21, shafts 22, and cranks 23 to the clamping members 14 in the same manner as in the other figures of the drawing. Said rod 16, however, is provided with a projecting arm 31 between which and the base bar 3 is a balancing spring 32 which causes the movement of the parts to take place evenly and with regularity. The upper end of the rod 16 is pivotally attached to a lever 33, the opposite end of which is pivoted to the lower end of a horizontal arm 34 that is rigidly attached to the upper end of the main frame 30. An eye 35 is carried by a yoke 36 which embraces the arm 34 and is pivoted to the lever 33. Said lever 33 may be made in one or more parts as desired. When the lifting crane is applied to the eye 35, the effect obviously will be to lift upon the lever 33, turning it upon its pivot at the end of the arm 34, and this lifting effect draws upwardly upon the vertical rod 16 and applies the clamping members 14 to their work. Therefore, the initial lifting movement of the machine which takes place when the suspending mechanism catches and lifts upon the eye 35 is indicated through the mechanical features described so as to cause the clamps 14 to be automatically brought into action.

The operation of the machine will be evident from the foregoing description of the construction without the need of additional detailed explanation. Obviously when the clamping members 14, which are located centrally of the split basic layer, begin to exert pressure against the sections of said layer, the result will be that said sections and consequently the entire basic layer will be held in a tight vise like grip of sufficient strength to enable a considerable superposed weight to be raised simultaneously with the lifting of the basic layer.

Ordinarily, of course, the lifting of the superposed mass does not depend entirely upon the clamping of the basic layer effectually because I employ the lifting finger 5 which is gripped to the base bar 3 intermediately between its ends. This lifting finger, as I have already explained, projects into a space between certain members of the basic layer of bricks, as shown in Fig. 5, and rests beneath the superposed mass so that when the lifting action begins said device lifts upon said mass. The end plates or members 4 may likewise be arranged to lift as shown in Fig. 5, or as may be found preferable in some cases these end members may serve simply as abutments against which the clamping devices will press the sections of the lower layer and firmly hold the same. Obviously there may be cases where it will be found advisable to so arrange the device 5 that its lifting function will not be its principal function. In other words, the members 4 and 5 may all lift or may all be arranged not to lift, or in cases some may lift and the others not.

Many changes in the exact construction and the precise arrangement of the various parts of my invention may be made without exceeding the scope of the appended claims.

Having thus described my invention, what I claim as new and desire to secure by Letters Patent, is:

1. A machine for handling bricks, comprising a vertical frame, a pair of clamping devices centrally located at the base thereof, stationary abutments between which and said clamping members the sections of the basic layer of bricks are disposed, and means for actuating said central clamping members to effect the clamping action, said means including a yoke, a link for operating it, and movable connections between the yoke and the clamps.

2. A machine for handling bricks, designed for operation in conjunction with a split basic layer, of a stack of bricks set in a prearranged order, said machine comprising a vertical frame, gripping devices located at a single point in the basic layer, stationary abutments between which and said gripping devices the sections of the basic layer are clamped, and means for actuating said gripping devices including a yoke, a vertically movable rod for operating it, and movable connections between the yoke and the gripping devices.

3. A machine for handling bricks, comprising a main frame, the base of which is formed with a rectangular yoke designed to embrace a stack formation of bricks and provided with parallel members at the ends of the basic layer, a lifting finger centrally disposed at the base of the frame and designed to be inserted into a space in the length of the basic layer, and clamping devices operating in conjunction with said basic layer to clamp the same together with means for actuating said clamping devices, including a yoke, a vertically movable rod for operating it, and movable connections between the yoke and the clamping devices.

4. A machine for handling bricks, comprising a vertically disposed frame, rigid abutments at the lower end thereof designed to embrace the ends of the basic layer, a central rigid lifting finger projecting into a space in the basic layer, clamping devices arranged on the opposite sides of said intermediate lifting device, crank shafts supported below said lifting device and connected to the clamping members, curved arms rigidly attached to said shafts, and means whereby said arms are actuated for the purpose of rocking the shafts and actuating the clamping members.

5. A machine for handling bricks, comprising a main vertical frame, having at the base stationary end plates adapted to serve as abutments at the ends of the lower layer of bricks and against which the ends of said layer may be clamped, a central lifting device rigidly affixed to the frame midway between the said end abutments and adapted to project into a space in the basic layer, parallel clamping plates at opposite sides of the lifting device, said plates being adapted to bind against the adjacent sections of the basic layer, and means for actuating said plates, including crank shafts, curved arms attached to said shafts, a yoke pivoted to said arm, a vertically actuating rod pivoted to said yoke, and means for vertically reciprocating said rod for the purpose of causing the plates to clamp the bricks.

6. A machine for handling bricks, designed for operation with a stack set in a prearranged order with its basic layer shorter than the superposed mass and split into parts, said machine comprising a main frame, stationary abutments at the ends thereof to form a rectangular yoke embracing the stack, a lifting finger intermediate between said stationary abutments and designed to lift the superposed mass by being projected into a space in the basic layer, clamping means for tightly holding the sections of the basic layer, an operating lever for actuating said clamping means, said lever having an eccentric, and lever connections between said operating means and the clamping means, including an eccentric ring engaged by the aforesaid eccentric.

7. A machine for handling bricks, comprising a main frame, plates at the lower end thereof for holding firmly the ends of the basic layer when clamped, an intermediate lifting device, movable clamping plates at the opposite sides of said device designed to actuate against the sections of the basic layer, horizontal shafts supported below the lifting device and carrying crank arms and pivoted to the clamping plates, curved arms rigidly attached to said shafts, a yoke pivoted to said arms, and means extending to the upper end of the frame for lifting and depressing said yoke so as to actuate the clamp at times and also to release the latter.

8. A machine for handling bricks, comprising a main frame, plates rigidly secured to said frame at the base thereof and designed to lie at the ends of the basic layer of a stack of bricks set in a prearranged order, a lifting device rigidly attached to the frame and projecting into an open space in said basic layer, clamping plates at the sides of said device arranged to exert their power against the adjacent bricks of the basic layer, parallel shafts supported below said lifting device and having crank arms pivoted to the clamping devices, a yoke having intermediate connections with the shafts for rocking the latter, a vertical rod for actuating said yoke and having at its upper end an eccentric ring, an eccentric within said ring, a shaft on which it is supported, and means for rocking said shafts.

9. A machine for handling bricks, comprising a main frame having a rectangular construction at the base adapted to partially surround a stack of bricks set in a prearranged order, a lifting finger secured rigidly to the base of said frame and designed to lift the bricks at a single point, a clamp arranged in connection with said lift and adapted to grip the basic layer, a lever for operating said clamp, said lever having an eccentric and connections between said lever and the clamp including a ring engaged by said eccentric, all substantially as described.

10. In a machine for handling bricks, a main frame, clamps carried thereby, a forwardly extending arm at the upper end of said frame, adapted to project over the load, and an adjustable weight carried by said projecting arm and adapted to be located at any desired point thereon relatively to the center of gravity of the loaded or unloaded machine.

11. In a machine for handling bricks, the combination with a main frame having horizontally projecting clamping devices at the base thereof, and an upper horizontally projecting arm, of ponderable means adapted to be adjusted on said upper arm for the purpose of enabling the center of gravity of the machine to be maintained when loaded or unloaded.

12. A machine for handling bricks, comprising a vertically disposed frame, rigid abutments at the lower end thereof designed to embrace the ends of the basic layer, a clamping mechanism, shafts supported in the frame and having crank arms engaging the said clamping mechanism, curved arms rigidly attached to the shafts, and means whereby said arms are actuated for the purpose of rocking the shafts and actuating the clamp members.

In testimony whereof I affix my signature in presence of two witnesses.

RAYMOND C. PENFIELD.

Witnesses:
FRANK PAUL,
C. B. SCHROEDER.